(12) United States Patent
Zhang (10) Patent No.: US 10,350,745 B2
(45) Date of Patent: Jul. 16, 2019

(54) GRAVITY LOCKING MECHANISM

(71) Applicants: Robert Bosch Tool Corporation, Broadview, IL (US); Robert Bosch GmbH, Stuttgart (DE)

(72) Inventor: Xusheng Zhang, Palatine, IL (US)

(73) Assignees: Robert Bosch Tool Corporation, Broadview, IL (US); Robert Bosch GmbH, Stuttgart, DE (US)

( * ) Notice: Subject to any disclaimer, the term of this patent is extended or adjusted under 35 U.S.C. 154(b) by 765 days.

(21) Appl. No.: 14/925,013

(22) Filed: Oct. 28, 2015

(65) Prior Publication Data
US 2016/0121477 A1 May 5, 2016

Related U.S. Application Data

(60) Provisional application No. 62/069,980, filed on Oct. 29, 2014.

(51) Int. Cl.
*B25H 1/08* (2006.01)
*F16M 13/02* (2006.01)
*B25H 1/00* (2006.01)

(52) U.S. Cl.
CPC ............ *B25H 1/08* (2013.01); *B25H 1/0064* (2013.01); *F16M 13/022* (2013.01)

(58) Field of Classification Search
CPC ............ E05F 1/1276; Y10T 292/1063; Y10T 70/5522; E05B 15/0093; E05B 65/5292; Y10S 220/908; Y10S 292/29
See application file for complete search history.

(56) References Cited

U.S. PATENT DOCUMENTS 1,490,874 A * 4/1924 Webb ............... E05F 11/00
292/108
2,627,435 A * 2/1953 Borrup ............... E05F 11/00
292/198

(Continued)

FOREIGN PATENT DOCUMENTS

CN 201555001 U 8/2010

OTHER PUBLICATIONS

International Search Report and Written Opinion corresponding to PCT Application No. PCT/US2015/057767, dated Feb. 5, 2016 (10 pages).

(Continued)

*Primary Examiner* — Mark A Williams
(74) *Attorney, Agent, or Firm* — Maginot Moore & Beck LLP (57) ABSTRACT

A gravity locking system includes a mounting structure and an article which includes an alignment structure, gravity load structure, and locking structure. The alignment structure is fixed to the article and aligns the article with the mounting structure. The gravity load structure is movable on the article and biased toward an unrestrained position. As the article moves toward the mounting structure, the gravity load structure moves away from the unrestrained position. The locking structure is movable on the article such that movement of the gravity load structure away from and toward the unrestrained position corresponds with movement of the locking structure toward and away from a closed position respectively. When weight of the article is supported by the gravity load structure on the mounting structure, the locking structure is urged against the mounting structure to lock the locking mechanism.

20 Claims, 8 Drawing Sheets

(56) References Cited

U.S. PATENT DOCUMENTS

| | | | |
|---|---|---|---|
| 2,697,389 A | | 12/1954 | Heckman |
| 3,642,314 A | | 2/1972 | Smith et al. |
| 5,042,856 A | | 8/1991 | Goodman |
| 5,094,578 A | | 3/1992 | Light et al. |
| 5,123,664 A | | 6/1992 | DeMars |
| 5,201,445 A | | 4/1993 | Axelman |
| 5,369,843 A | | 12/1994 | Yu |
| 5,415,314 A | * | 5/1995 | McCollum ............ B65F 1/1615 220/264 |
| 5,419,598 A | * | 5/1995 | Kreitzer ................ B65F 1/1615 292/205 |
| 5,513,862 A | | 5/1996 | Chuang |
| 5,566,431 A | * | 10/1996 | Haglund ............ A44B 11/2526 24/633 |
| 5,586,008 A | | 12/1996 | Kozel et al. |
| 6,302,428 B1 | * | 10/2001 | Jungkind ............... A63C 10/10 280/14.22 |
| 6,397,534 B1 | | 6/2002 | Hager et al. |
| 6,666,485 B1 | | 12/2003 | Moret |
| 7,416,421 B2 | | 8/2008 | Kapinos et al. |
| 2005/0212227 A1 | | 9/2005 | Pham et al. |
| 2006/0076756 A1 | | 4/2006 | Wu |
| 2010/0148523 A1 | * | 6/2010 | Tai ...................... E05B 17/2038 292/236 |
| 2012/0067185 A1 | | 3/2012 | Weusthof |
| 2012/0085394 A1 | | 4/2012 | McPheeters et al. |
| 2013/0228986 A1 | | 9/2013 | Corbeil et al. |

OTHER PUBLICATIONS

Supplementary European Search Report corresponding to European Patent Application No. 15 85 3874 (11 pages).

\* cited by examiner

GRAVITY LOCKING MECHANISM

RELATED APPLICATION

This Application claims priority to U.S. Provisional Application No. 62/069,980 filed on Oct. 29, 2014, entitled "GRAVITY LOCKING MECHANISM," the disclosure of which is incorporated by reference herein in its entirety.

TECHNICAL FIELD

This disclosure relates generally to locking mechanisms, and, more particularly, to gravity or weight actuated locking mechanisms, in particular for mounting systems configured to mount power tools onto a work surface.

BACKGROUND

Locking mechanisms of various types have long been used for a wide variety of applications. A locking mechanism generally has two states, a locked state, whereby the locking mechanism restrains an article, and an un-locked state, whereby the article is not restrained. An actuation member is generally is operable to switch the locking mechanism between the locked and un-locked states. Different types of locking mechanisms and actuation members may be optimal for different types of applications. For instance, it may be desirable for a locking mechanism to self-engage and automatically switch between the un-locked state and the locked state under certain circumstances, such as the position or orientation of the article, for example.

In one example, U.S. Pat. No. 5,123,664 describes a locking mechanism for removably coupling an ice skate runner to a skate shoe without manual manipulation of the locking mechanism. Where a definition or use of a term in a reference is inconsistent or contrary to the definition of that term provided herein, the definition of that term provided herein applies to this disclosure and the definition of that term in the reference does not apply to this disclosure. In U.S. Pat. No. 5,123,664, a user positions a slot of the runner over a pin on the skate shoe. Stepping into the skate shoe pushes a locking end of the runner into a snap-locking mechanism on the shoe, and the user's weight causes the snap-locking mechanism to engage and lock the locking end of the runner in place. In order to unlock the snap-locking mechanism and remove the runner, the user manually engages a release that disengages the snap-locking mechanism.

In some applications, it is desirable that an article can be released without having to engage a manual release. Self-disengaging locking mechanisms have been developed that are configured to un-lock under certain conditions. U.S. Pat. No. 5,042,856 describes a locking mechanism for a dumpster lid that uses a counterweight such that when the dumpster is moved from an upright to an inverted position, i.e. when being emptied by a garbage collection truck, gravity acts on the counterweight and unlocks the lid. Other similar examples known in the art include hooks that release at a certain orientation, or moving elements that are brought into an actuation position by gravity when in a certain orientation, such as, for example, the rolling sphere in the gravity locking articulation of a briefcase that unlocks when the briefcase is properly oriented, as described in U.S. Pat. No. 5,369,843. Some locking mechanisms, such as ski bindings, are designed to automatically release under extreme forces such as those experienced in a ski crash.

However, in some applications, it is desirable to restrain the orientation and position of the article in a way that enables easy installation and removal of the article without manual manipulation of a locking member or release member and without requiring an undue amount of force. In an example, it is often desirable to use a mounting system to mount an article such as a power tool like a miter saw onto a workspace. Such mounting system desirably restrains both the location and orientation of the power tool on the workspace, as movement or rotation may damage a workpiece or the tool, or injure a user. Such systems also desirably provide for easy installation and removal of the tool from the mounting system.

Various types of mounting systems for power tools have been developed. Generally, such mounting systems either completely restrain the tool, such as by using clamps, bolts, etc., thus requiring manual release of such restraints in order to remove the tool, or only partially restrain the tool, such as by drop-in mounts or groove-and-slide mounts which permit vertical and lateral motion respectively. Therefore, what is needed is a locking mechanism that automatically engages when an article is properly positioned, restrains the location and orientation of the article when engaged, and disengages without requiring use of a manual release.

SUMMARY

The following is a brief summary of subject matter described in greater detail herein. This summary is not intended to be limiting as to the scope of this disclosure or to the claims.

In order to facilitate locking and unlocking an article to and from a mounting system, respectively, without manual actuation of an actuation member, a locking mechanism according to this disclosure is configured so as to be actuated by weight of the article. In other words, the weight of the article actuates the locking mechanism to switch from an unlocked state to a locked state. Additionally, the locking mechanism is disengaged, i.e., switched from the locked state to the unlocked state, when the weight of the article is removed.

In an embodiment, the mounting structure is rigidly supported on a surface, such as a workbench, wall, or the like, and defines a first alignment surface, a first locking surface, and a first load surface. An article to be locked in terms of orientation and position on the surface includes an alignment structure, a gravity load structure, and a locking structure.

The alignment structure is fixed to the article, and defines a second alignment surface that, once engaged with the first alignment surface, aligns the article with the mounting structure.

The gravity load structure is movable on the article, is biased toward an unrestrained position, and defines a second load surface facing toward the mounting structure. As the article moves toward the mounting structure, the second load surface comes into contact with and bears against the first load surface to move the gravity load structure away from the unrestrained position.

The locking structure is movably attached to the article, and configured such that a movement of the gravity load structure away from and toward the unrestrained position corresponds with a movement of the locking structure toward and away from a closed position respectively. The locking structure defines a second locking surface that engages the first locking surface in the closed position to delimit the corresponding movement of the locking structure and the gravity load structure such that as at least a portion of a weight of the article is supported on the first load surface via the second load surface, the second locking surface is urged against the first locking surface to hold the mounting structure captive between the locking structure and the alignment structure and lock the locking mechanism.

In an embodiment, the gravity load structure is integral with the locking structure to form a gravity load and locking structure. In an embodiment, the gravity load and locking structure is mounted to the article so as to be pivotable about an axis normal to a side of the article. In an embodiment, the gravity load and locking structure defines a key member configured to be received in a complementary slot defined in the mounting structure in order to engage the mounting structure.

In another embodiment, the locking structure is configured to move laterally relative to the article, and the gravity load structure is configured to move vertically relative to the article.

In one embodiment, once the first alignment surface is engaged with the second alignment surface, the alignment structure acts as a pivot to rotate the article toward the mounting structure so that the first load surface bears against the second load surface to move the gravity load structure away from the unrestrained position.

In another embodiment, the mounting structure is a substantially linear member, where the first alignment surface defines one end of the linear member, the first locking surface defines an opposite end of the linear member, and the load surface defines a side of the linear member therebetween facing toward the gravity load structure.

In one embodiment, the mounting structure includes a pair of rigidly supported external pins. A first pin includes the first alignment surface, and the alignment structure is configured to engage the first pin. A second pin includes the first load surface and the first locking surface and the gravity load structure and locking structure are configured to engage the second pin.

In an embodiment, the locking mechanism also includes a position engagement structure configured to apply an additional bias on at least one of the gravity load structure and the locking structure. The addition bias may be configured to act to move the gravity load structure and the locking structure toward the unrestrained position and away from the closed position respectively, or to act to move the gravity load structure and the locking structure away from the unrestrained position and toward the closed position respectively. In one embodiment, the position engagement structure is further configured to disengage the additional bias once the additional bias force is overcome by a counteracting force.

In another embodiment, the locking mechanism further includes a safety structure that is configured to engage the gravity load structure and the locking structure to inhibit the movement of the gravity load structure and the locking structure.

In one embodiment of a locking mechanism for removably mounting an article to a mounting structure, the locking mechanism includes a gravity load and locking structure that is movably attached to the article and that is configured to transition between an open state, a closed state, and a locked state. In the open state, the gravity load and locking structure is unengaged with the mounting structure and the article is unrestrained by the locking mechanism. In the closed state, the gravity load and locking structure is engaged with the mounting structure and the article is unrestrained by the locking mechanism. In the locked state, although the article, the gravity load and locking structure, and the mounting structure are in the same positions relative to each other as in the closed state, the mounting structure is allowed to support at least a portion of the weight of the article via the gravity load and locking structure, which causes the gravity load and locking structure to engage the mounting structure and restrain the article thereon to lock the locking mechanism.

In an embodiment, the gravity load and locking structure is configured to transition between the open state and the closed state based on a position of the article relative to the mounting structure. In another embodiment, the gravity load and locking structure is configured to transition between the closed state and the locked state based on whether the portion of the weight of the article is supported on the mounting structure via the gravity load and locking structure.

The above presents a simplified summary of this disclosure in order to provide a basic understanding of some aspects of the technologies disclosed herein, and is not an extensive or complete overview of such topics. As such, the summary above does not delineate the scope of this disclosure, and is not intended to identify key or critical aspects of the disclosure. Further details are provided by the detailed description, the claims, and the drawings.

DETAILED DESCRIPTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one skilled in the art to which this document pertains.

Figure 1:
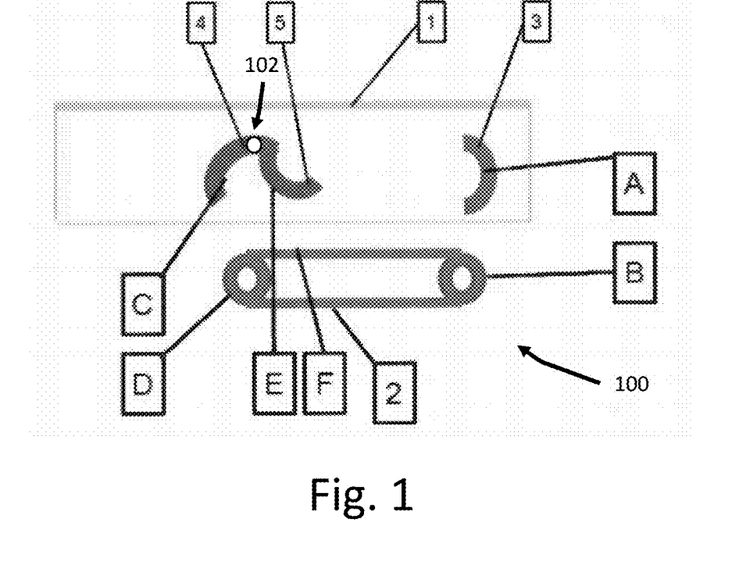
FIG. 1 is a side view of an exemplary embodiment of a locking mechanism according to the disclosure in an open position.

FIG. 1 illustrates a side view of an exemplary embodiment of a locking mechanism 100 according to this disclosure. The locking mechanism 100 includes an alignment structure 3 and a gravity load and locking structure 4 disposed on a side of an article 1 to be locked, and a mounting structure 2 for supporting the article 1. Although not illustrated in FIG. 1, the mounting structure 2 is rigidly supported on a fixed surface. For example, the mounting structure 2 may be mounted to a workbench or other rigid support. The alignment structure 3 is spaced apart from the gravity load and locking structure 4 by a distance associated with a length of the mounting structure 2.

The alignment structure 3 is configured to be immobile relative to the article 1. In this embodiment, the alignment structure 3 is integral with the side of the article 1, but in other embodiments, the alignment structure may be a separate component connected to the article 1, such as by a weld, screws, snaps, etc. The alignment structure 3 defines an alignment surface A.

The gravity load and locking structure 4 is movably connected to the side of the article 1 so as to be movable between an open and unlocked state as illustrated in FIG. 1 and a closed and locked position as described in more detail below. In this embodiment, the gravity load and locking structure 4 is rotatably connected to the article 1, such as by a pivot 102 which can be a pin, bearing, or the like, so as to be rotatable about an axis that is normal to the side of the article 1. In other embodiments such as, for example, some of the other embodiments described below, the gravity load and locking structure 4 is movably connected to the side of the article 1 in other ways. As illustrated in FIG. 1, the gravity load and locking structure 4 includes a gravity load portion 5 and a first locking surface C that is rotationally offset from the gravity load portion 5 about the axis of rotation of the pin 102.

In the embodiment illustrated in FIG. 1, the gravity load and locking structure 4 is defined by a first C-shaped curve that includes the gravity load portion 5, and a second C-shaped curve that includes the first locking surface C on an inside thereof. The first C-shaped curve is rotationally offset about the pin 102 from the second C-shaped curve, and the top of the first C-shaped curve is connected to the top of the second C-shaped curve. In other embodiments, the gravity load and locking structure 4 may have other shapes.

The gravity load and locking structure 4 is configured to be rotationally biased toward an unrestrained position as illustrated in FIG. 1. In this embodiment, the gravity load portion 5 of the gravity load and locking structure 4 has a higher weight relative to a remainder of the gravity load and locking structure 4. The higher weight may be due to, for example, a different material in the gravity load portion 5, additional material in the gravity load portion 5, or the gravity load portion 5 may be solid while at least a portion of the remainder of the gravity load and locking structure 4 is hollow. The higher weight of the gravity load portion 5 creates a moment about the pin 102 that biases the rotational position of gravity load and locking structure 4 due to gravity such that, when unrestrained, the gravity load and locking structure 4 rotates to the unrestrained position in FIG. 1.

In other embodiments, the gravity load and locking structure is biased toward the unrestrained position via any other acceptable technique, such as via a spring, or via an biasing force applied by a further bias member, for example.

The mounting structure 2 defines an alignment surface B, a second locking surface D and a load surface F. The alignment surface B is on a right side of the mounting structure 2 in FIG. 1, and is complementary with the alignment surface A, such that the alignment surface B is configured to engage/be received by the alignment surface A.

In this embodiment, the second locking surface D is opposite the alignment surface B, on the left of the mounting structure 2 in FIG. 1, but in other embodiments, the second locking surface D may be at other locations on the mounting structure 2. The second locking surface D is complementary with the first locking surface C, such that the first locking surface C of the gravity load and locking structure 4 is configured to receive/engage the second locking surface D of the mounting structure 2. The load surface F extends between the second locking surface D and the alignment surface B on a side of the mounting structure 2 facing the gravity load portion 5. In this embodiment, the mounting structure 2 is a substantially linear member with rounded ends, although in other embodiments, the mounting structure 2 may have other shapes.

Figure 2:
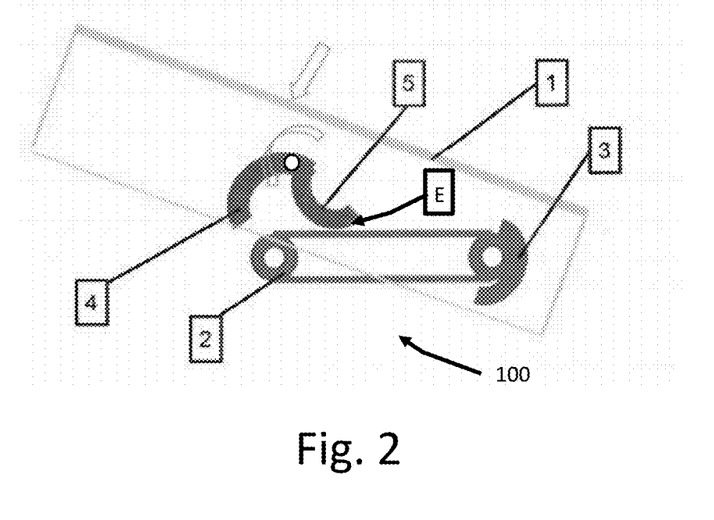
FIG. 2 is a side view of the locking mechanism of FIG. 1 with the article to be mounted properly positioned for mounting using the locking mechanism.

In order to mount the article 1 on the mounting structure 2, the alignment surface A of the alignment structure 3 is aligned with the alignment surface B of the mounting structure 2 so that the alignment surface B is received in the alignment structure 3 as illustrated in FIG. 2. The article 1 in FIG. 2 is at an angle relative to the mounting structure 2 so that the gravity load and locking structure 4 is above the alignment structure 3. This configuration enables the alignment surface B to be received in the alignment structure 3 without interference from the gravity load and locking structure 4. As illustrated in FIG. 2, because the gravity load and locking structure 4 is unrestrained, the gravity load portion 5 has rotated the gravity load and locking structure 4 from its position in FIG. 1 relative to the article 1 since, when unrestrained, the position of the gravity load and locking structure is based on gravity and not on an orientation of the article 1.

Figure 3:
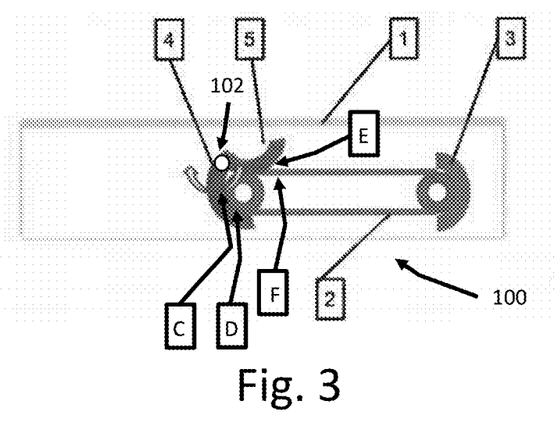
FIG. 3 is a side view of the locking mechanism of FIG. 1 in a closed position.

To move the locking mechanism from the open and unlocked state of FIGS. 1 and 2 to a closed but unlocked state illustrated in FIG. 3, the article 1 is pivoted toward the mounting structure 2 about the alignment surface B. The gravity load portion 5 of the gravity load and locking structure 4 defines a load surface E facing toward the load surface F of the mounting structure 2. The alignment structure 3 operates as a pivot by which the article 1 may be rotated to move the gravity load and locking structure 4 toward the mounting structure 2. In this embodiment, the article 1 is rotated in a counter-clockwise direction from its position in FIG. 2 to a position in FIG. 3 where the article 1 is level with the mounting structure 2.

As the article is rotated from the angled position in FIG. 2 to the level position in FIG. 3, the load surface E of the gravity load portion 5 comes into contact with and bears against the load surface F of the mounting structure 2. Since the mounting structure 2 is rigidly supported, as the article 1 continues to rotate about the alignment structure 3, the pin 102 moves in a downward direction. Because the load surface E of the gravity load portion 5 is restrained by the load surface E of the mounting structure, the continued motion of the article 1 counteracts the biasing force acting on the gravity load and locking surface 4, and causes the gravity load and locking structure 4 to rotate about the pin 102, in this embodiment in a counter-clockwise direction. As least some of counter-action of the biasing force may be due to the weight of the article 1 pushing the article 1 toward the mounting structure 2.

The rotation of the article 1 causes the locking surface C of the gravity load and locking structure 4 to move toward the locking surface D until the locking surface C comes into contact with the locking surface D, as illustrated in FIG. 3. Once the locking surface C of the gravity load and locking structure 4 is in contact with the locking surface D of the mounting structure 2, as illustrated in FIG. 3, the locking mechanism 100 is in a closed but unlocked state. The locking surface D also acts as a stop for the locking surface C, and delimits a range of motion of the gravity load and locking structure 4.

To move the locking mechanism 100 from the closed but unlocked state into a closed and locked state, at least a portion of the weight of the article is allowed to be supported by the load surface F of the mounting structure via the load surface E of the gravity load and locking structure 4. Because the locking surface C is stopped against the locking surface D, the load surface E can no longer move in response to the action of the load surface F. Thus, the weight of the article biases the load surface E against the load surface F, and results in the locking surface C being biased against the locking surface D so that the mounting structure 2 is held captive between the locking surface C of the gravity load and locking structure 4 and the alignment structure 3.

Once at least a part of the weight of the article 1 is supported via the load surface E on the load surface F, the gravity load and locking structure 4 will not be able to rotate toward the unrestrained position until the weight of the article 1 is removed from the load surface F. Thus, the article 1 is held captive on the mounting structure 2, and the locking mechanism 100 is in a closed and locked state.

For example, in this embodiment, the locking surface C is complementary to the locking surface D, such that the engagement of the locking surfaces C and D results in a form connection, whereby the geometric engagement between the locking surfaces C and D holds the article 1 in place relative to the mounting structure 2. In another embodiment, the engagement of the locking surfaces C and D results in a force connection, whereby friction between the locking surfaces C and D holds the article 1 in place relative to the mounting structure 2. Other types of acceptable engagements are also contemplated, such as via magnets, suction, or the like.

Once the locking mechanism 100 is in the closed and locked state, the angle of the article 1 relative to the mounting structure 2 cannot be changed without the weight of the article 1 being removed from the load surface F since the mounting structure 2 is held captive between the alignment structure 3 and the gravity load and locking structure 4. In contrast, when in the closed but unlocked state, the article 1 may be freely rotated away from the mounting structure 1, since the weight of the article 1 is otherwise supported. In other words, the locking mechanism 100 automatically engages a locked state due to the weight of the article 1 once the article 1 is properly positioned relative to the mounting structure, and automatically disengages the locked state when the weight of the article 1 is otherwise supported to enable removal of the article 1 from the mounting structure 2. Once the weight of the article 1 is otherwise supported, the article 1 may be pivoted about the alignment surface B via the alignment structure 3 to move the article 1 from the level position in FIG. 3 toward the angled position in FIG. 2, whereby the locking mechanism is once again open and unlocked.

The locking mechanism 100 with the behavior described above is a gravity or weight actuated locking mechanism. In other words, the state of the locking mechanism is based on not only the mechanical configuration of the locking mechanism 100 or the positions and orientations of the locking mechanism 100 as a whole or the article 1 in particular, but also upon a support condition of the weight of the article 1 to be restrained.

In an exemplary use case, it may be desirable to mount an article such as a power tool on a surface such as a workbench, without requiring the manual actuation of a locking mechanism, such that the article is restrained at to both its position and orientation. By using a locking mechanism 100 according to this disclosure, a user may align the power tool with a mounting structure 2 that is mounted on the workbench, and release the weight of the power tool. Since the weight of the tool is at least partially supported by the mounting structure 2, the locking mechanism 100 is in a locked state, and the tool cannot be repositioned or reoriented without otherwise supporting the weight of the tool.

It may also be desirable to remove an article such as a power tool from a surface such as a workbench without requiring the manual release of a locking mechanism. By using a locking mechanism 100 according to this disclosure, a user may lift the article 1 away from the mounting structure 2. The act of lifting the article 1 supports the weight of the article 1, such that the locking mechanism is unlocked, and thus the article 1 may be freely removed.

In the following embodiments of locking mechanisms according to this disclosure, similar elements are referred to with like references. The following embodiments are also described so as to highlight differences from the locking mechanism 100. Unless stated otherwise, elements in the embodiments below operate and are configured in a similar fashion to like elements in the locking mechanism 100 described above.

Figure 4:
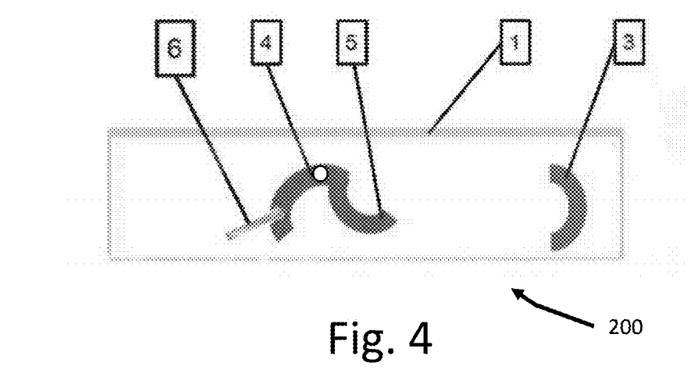
FIG. 4 is a side view of another exemplary embodiment of a locking mechanism according to the disclosure in an open position.

FIG. 4 illustrates a side view of another exemplary embodiment of a locking mechanism 200 according to the disclosure that further includes a position engagement structure 6. The position engagement structure 6 is connected to the side of the article 1, and is configured to provide an additional bias force on the gravity load and locking structure 4 that biases the gravity load and locking structure toward and/or the unrestrained position.

In an exemplary use case, an article 1 may be desirably mounted at an orientation at an angle to the level position in FIG. 2. In another example, the article 1 may be subject to external forces, such as motion during transport, vibrations, etc. In such cases, the gravity load and locking structure may undesirably rotate such that the gravity load and locking structure 4 is out of alignment with the mounting structure 2 and thus is unable to allow mounting of the article 1 thereon.

In one example, a user is manipulating an article 1. Such manipulation might otherwise result in the gravity load and locking structure rotating about the pin 102 so that the article 1 cannot be received on the mounting structure 2 in the fashion described above. The position engagement structure 6 may be engaged to apply a bias force that acts to bias the gravity load and locking structure toward the unrestrained position to ensure that the article 1 may be mounted despite the motion of the user. In an embodiment, rotation of the gravity load and locking structure 4 causes the position engagement structure 6 to disengage, such that after the article 1 is aligned with the mounting structure 2, the bias force of the position engagement structure is no longer applied.

In another example, an article 1 is mounted on a mounting structure 2 in a moving vehicle. Upon the vehicle hitting a bump, the weight of the article 1 may be temporarily removed from the mounting structure 2, which might unlock the locking mechanism. The position engagement structure 6 may be engaged to apply a bias force that acts to bias the gravity load and locking structure 4 away from the unrestrained position, so that the bias force of the position engagement structure 6 must be overcome in addition to the weight of the article 1 in order to unlock the locking mechanism. In an embodiment, rotation of the gravity load and locking structure 4 causes the position engagement structure 6 to disengage, such that after the bias force of the position engagement structure 6 and the weight of the article 1 are overcome, the bias force of the position engagement structure 6 is no longer applied.

Figure 5:
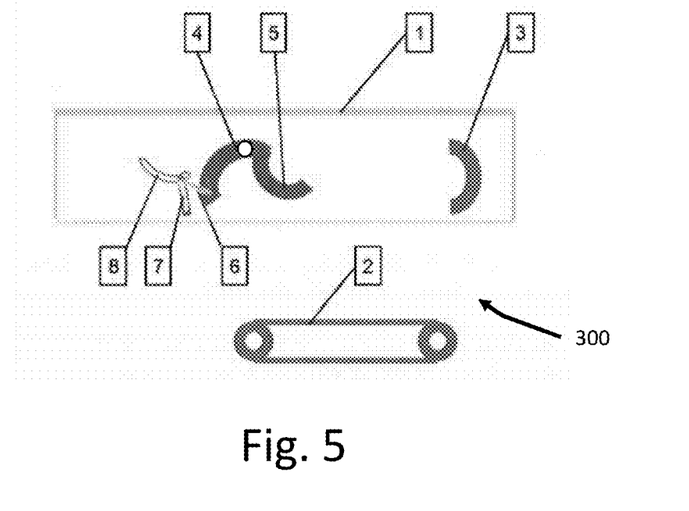
FIG. 5 is a side view of a further exemplary embodiment of a locking mechanism according to the disclosure in an open position.
Figure 6:
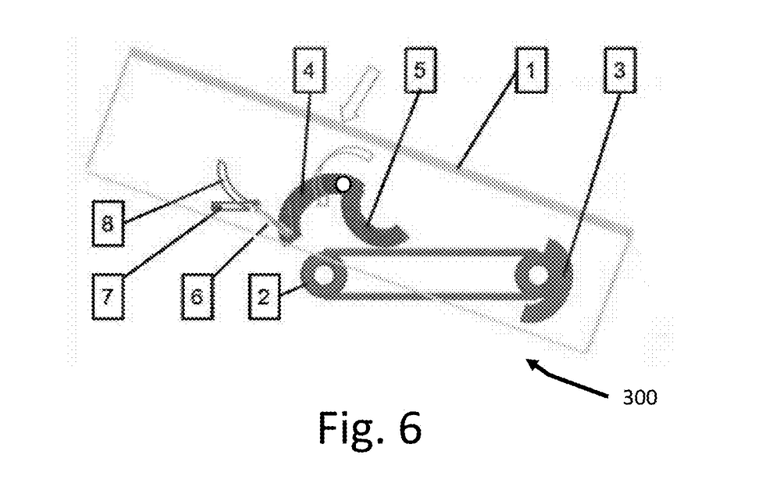
FIG. 6 is a side view of the locking mechanism of FIG. 5 with the article to be mounted properly positioned for mounting using the locking mechanism.
Figure 7:
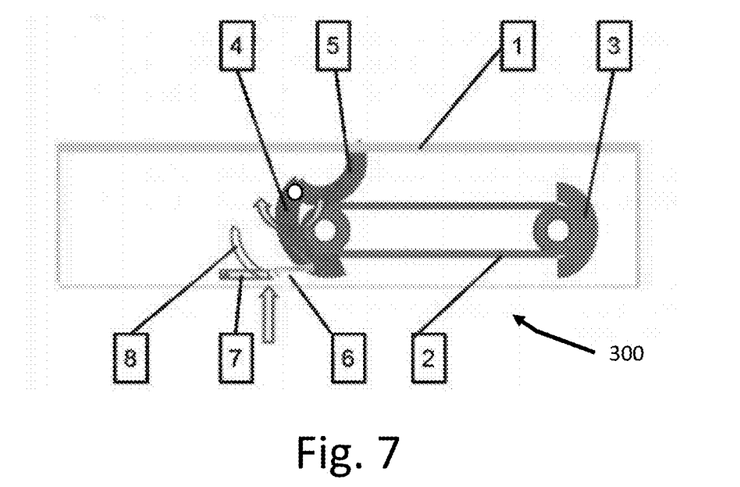
FIG. 7 is a side view of the locking mechanism of FIG. 5 in a closed position.

FIGS. 5-7 illustrate another exemplary embodiment of a locking mechanism 300 that further includes a safety member 7 and release member 8. The safety member 7, once engaged, is configured to fix the gravity load and locking structure 4 in place. Thus, the safety member 7 enables fixing the gravity load and locking structure 4 in any desired rotational position. For example, a user may fix the gravity load and locking structure 4 in an open state to prevent locking of the locking mechanism 300, or may fix the gravity load and locking structure 4 in a closed state to prevent unlocking of the locking mechanism. The release member 8 is configured to disengage the safety member 7. In FIG. 5, the position engagement structure 6 is engaged with the gravity load and locking structure 4, and the safety structure 7 that has been disengaged by the release member 8.

FIG. 6 illustrates the locking mechanism 300 of FIG. 5 whereat the article 1 is properly oriented for mounting with the mounting structure 2. Since the safety member 7 is disengaged, the gravity load and locking structure 4 is free to rotate about the pin 102. In FIG. 7, the safety member 7 has been engaged, and thus the gravity load and locking structure 4 cannot rotate toward the unrestrained position even when the weight of the article 1 is removed from the mounting structure 2.

However, it should be understood that releasing of the safety structure 7 via the release member 8 does not unlock the locking mechanism 300. Even when the safety structure 7 has been disengaged, the locking mechanism 300 is still in the locked state due to the portion of the weight of the article 1 still bearing on the mounting structure 2. In other words, while the safety structure 7 can be configured to prevent the locking mechanism 300 from being unlocked, releasing the safety structure 7 without removing the portion of weight of the article 1 would not itself unlock the locking mechanism 300.

Figure 8:
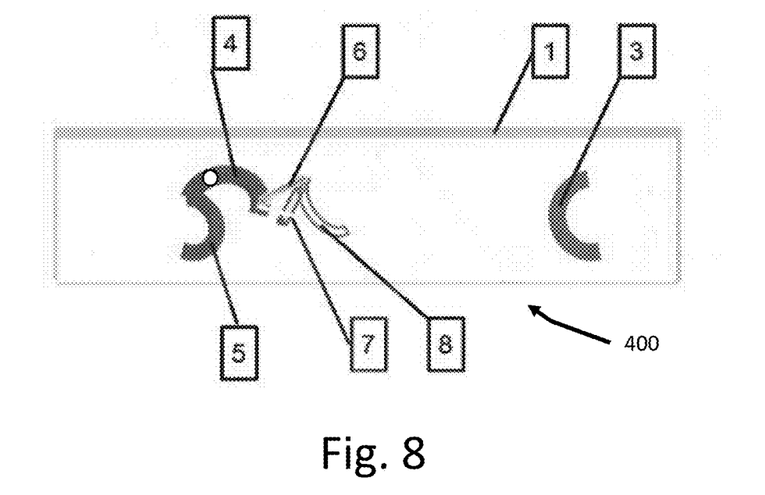
FIG. 8 is a side view of an additional exemplary embodiment of a locking mechanism according to the disclosure in an open position.
Figure 9:
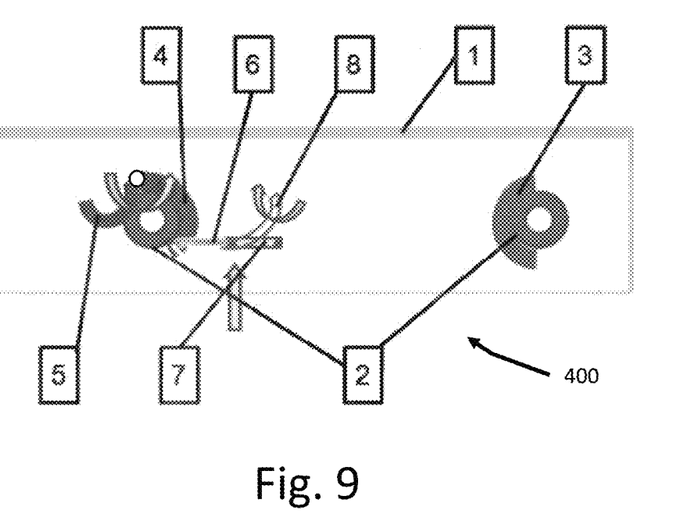
FIG. 9 is a side view of the locking mechanism of FIG. 8 in a closed position.

FIGS. 8 and 9 illustrate yet another exemplary embodiment of a locking mechanism 400. As illustrated in FIG. 9, rather than the substantially linear mounting structure described above, the locking mechanism 400 includes a mounting structure 2 that has external mounting pins 2. A pin 2 on the right in FIG. 9 includes the alignment surface B, and a pin 2 on the left in FIG. 9 includes the locking surface D and load surface F, but in other embodiments, the surfaces B, D, and F can be in different locations. In the embodiment illustrated in FIGS. 8 and 9, the gravity load and locking structure 4 is configured to rotate clockwise once the load surface C of the gravity load portion 5 encounters the load surface D of the mounting structure 2, as illustrated by the change in position of the gravity load and locking structure 4 between FIGS. 8 and 9.

Figure 10:
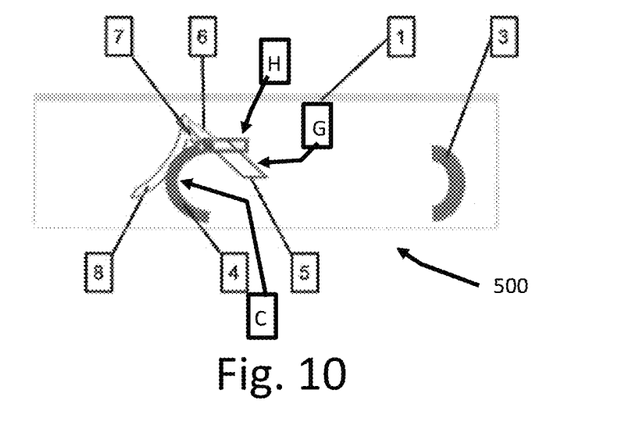
FIG. 10 is a side view of yet another exemplary embodiment of a locking mechanism according to the disclosure in an open position.
Figure 11:
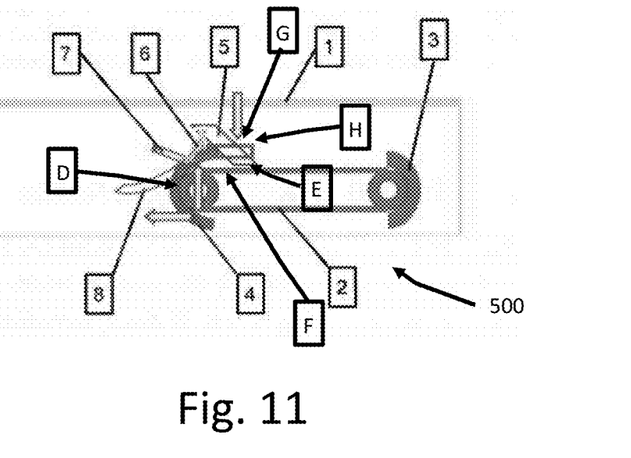
FIG. 11 is a side view of the locking mechanism of FIG. 10 in a closed position.

FIGS. 10 and 11 illustrate a further embodiment of a locking mechanism 500. In this embodiment, the gravity load portion 5 is separate from a locking structure 4. Unlike some other embodiments, the gravity load and locking structure 4 does not move by rotating about an axis normal to the article 1.

Instead, the locking structure 4 is movably mounted be movable laterally relative to the article 1. In this embodiment, the locking structure 4 has a substantially single curve C-like shape with a linear guide portion H at the top of the C-like shape that is configured to engage the gravity load structure 5.

The gravity load structure 5 is mounted to the article 1 above the locking structure 4 so as to be movable in a vertical direction relative to the article 1. The gravity load structure 5 is a substantially linear member that is oriented at an angle relative to the article 1, toward the right and down in FIGS. 10 and 11, that defines an angled surface G facing toward the linear guide portion H.

As the article 1 moves toward the mounting structure 2, the load surface F of the mounting structure 2 acts on the load surface E of the gravity load structure to move the gravity load structure 5 upwards. As the gravity load structure 5 moves upwards, the angled surface G bears against the linear guide portion H of the locking structure 4 and causes the locking structure 4 to move towards the mounting structure 2, toward the right in FIGS. 10 and 11, until the locking surface C of the locking structure 4 comes into contact with the locking surface D of the mounting structure. Once at least a portion of the weight of the article 1 bears on the mounting structure 2, the locking surface C is urged against the locking surface D, and the article 1 is held captive via the action of the locking structure 4 and alignment structure 3 on the mounting structure 2.

Because, in the unlocked position shown in FIG. 10, the locking structure 4 is horizontally spaced away from the locked position shown in FIG. 11 (i.e., to the left of the locked position in FIG. 11), the article 1 can be mounted on the mounting structure 2 without requiring the article 1 be oriented at an angle. In other words, the article can be positioned vertically above the mounting structure 2 and moved vertically to engage the gravity load structure 5 without any pivoting. Similarly, the article 1 can then be removed from the mounting structure 2 with a vertical motion without any pivoting.

Figure 12:
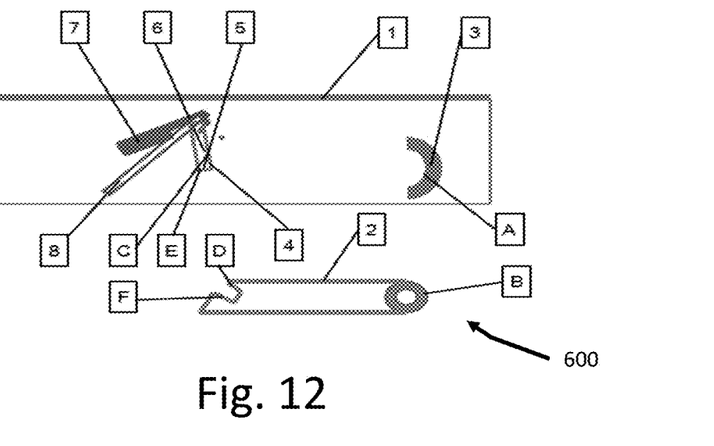
FIG. 12 is a side view of a still further exemplary locking mechanism according to the disclosure in an open position.
Figure 13:
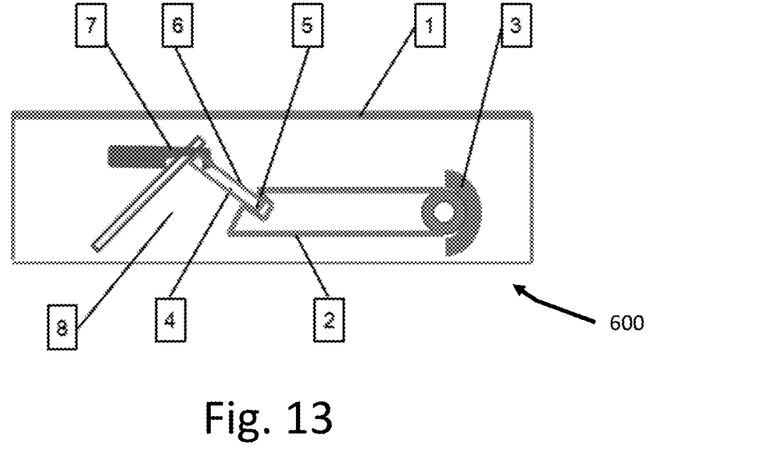
FIG. 13 is a side view of the locking mechanism of FIG. 12 in a closed position.
Figure 14:
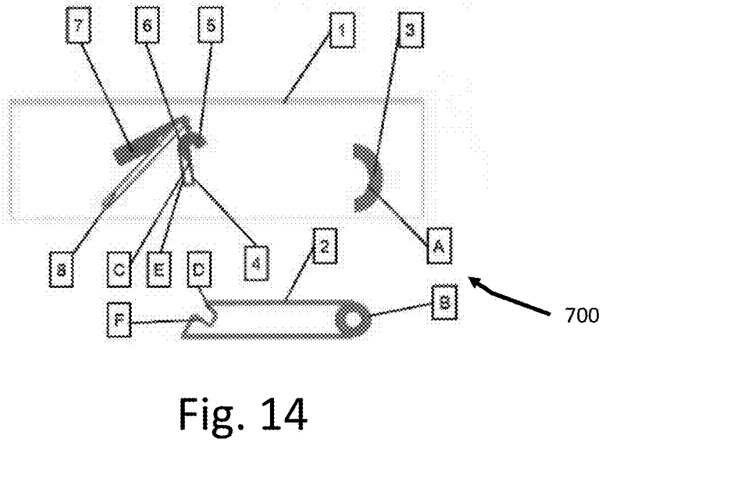
FIG. 14 is a side view of another exemplary embodiment of a locking mechanism according to the disclosure in an open position.
Figure 15:
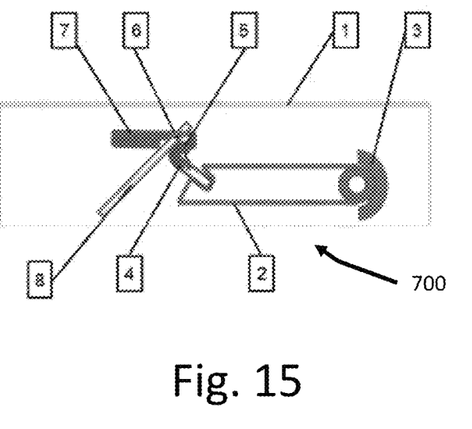
FIG. 15 is a side view of the locking mechanism of FIG. 12 in a closed position.

FIGS. 12 and 13 illustrate another exemplary embodiment of a locking mechanism 600 whereby the locking surface D and the second load surface F of the mounting structure form a locking slot, and whereby the locking surface C and first load surface E of the gravity load and locking structure 4 form a locking key 5 configured to engage the locking slot. When the weight of the article 1 causes the locking key 5 to bear against the second load surface F, the locking key 5 is rotated into the locking slot so as to engage the locking surface D and hold the article 1 captive on the mounting structure 2. FIG. 13 illustrates the locking mechanism 600 of FIG. 12 in the locked state. The gravity load and locking structure 4 as illustrated in FIG. 12 includes a gravity load portion 5 that is substantially linear, although other shapes of gravity load and locking structures having a locking key are also contemplated. As an example, in an exemplary embodiment of a locking mechanism 700 illustrated in FIGS. 14 and 15, the gravity load portion 5 includes a curved portion having an engagement surface.

Other shapes and configurations of load elements 5 and locking elements 4 are also contemplated.

While the example of a mounting system configured to mount power tools such as a miter saw to a work surface has been described above, it should be understood that the locking mechanism according to the disclosure can be used for a wide variety of applications, including but not limited to television and picture wall mounts, mountings for kitchen appliances, vehicle cup holders, lid fasteners, weight-actuated locks for chair wheels, and other mounting applications.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the disclosure.

It is claimed:

1. A gravity locking mechanism for removably mounting an article to a mounting structure, the gravity locking mechanism comprising:
   a gravity load and locking structure including:
      a gravity load portion movably attached to the article, wherein:
         the gravity load portion is biased toward an unrestrained position, and
         the gravity load portion is configured to engage the mounting structure and move away from the unrestrained position as the article moves toward a mounted position relative to the mounting structure; and
      a first locking surface movably attached to the article, the first locking surface configured such that:
         a movement of the gravity load portion toward and away from the unrestrained position corresponds respectively to a movement of the first locking surface away and toward a closed position of the first locking surface;
         the first locking surface is in the closed position when the article is in the mounted position, and
         in the closed position, the first locking surface engages the mounting structure and delimits the corresponding movement of the gravity load portion and the first locking surface;
      wherein the gravity load portion is further configured to support at least a portion of a weight of the article on the mounting structure such that the portion of the weight urges the gravity load portion against the mounting structure, and causes the first locking surface in the closed position to be urged against the mounting structure in order to restrain the article in the mounted position and lock the locking mechanism.

2. The locking mechanism of claim 1, wherein the gravity load portion is integral with the first locking surface.

3. The locking mechanism of claim 2, wherein:
   the gravity load and locking structure is mounted to the article so as to be pivotable about an axis normal to a side of the article; and
   the gravity load portion has a higher weight relative to a weight of a remainder of the gravity load and locking structure; the higher weight forming a moment about the axis normal to the side of the article due to gravity, such that the gravity load portion is rotationally biased about the axis normal to the side of the article toward the unrestrained position due to gravity.

4. The locking mechanism of claim 2, wherein the gravity load and locking structure defines a key member configured to be received in a complementary slot defined in the mounting structure in order to engage the mounting structure.

5. The locking mechanism of claim 1, wherein the first locking surface is configured to move laterally relative to the article, and the gravity load portion is configured to move vertically relative to the article.

6. The locking mechanism of claim 1, further comprising:
   an alignment structure fixed to the article and configured to engage with a surface of the mounting structure to align the article with the mounting structure.

7. The locking mechanism of claim 6, wherein with the first locking surface in the closed position, the mounting structure is held captive between the alignment structure and the first locking surface.

8. The locking mechanism of claim 7, wherein the alignment structure, once engaged with the mounting structure, enables the article to pivot about the alignment structure toward the mounting structure and causes the mounting structure to act on the gravity load portion counter to the biasing of the gravity load portion toward the unrestrained position, and move the gravity load portion away from the unrestrained position.

9. The locking mechanism of claim 6, wherein the alignment structure is configured to engage a first pin of the mounting structure, and the gravity load and locking structure is configured to engage a second pin of the mounting structure.

10. The locking mechanism of claim 1, wherein the biasing of the gravity load portion toward the unrestrained position causes the first locking surface to be urged away from the closed position and causes the gravity load portion to be urged toward the unrestrained position when the weight of the article is removed from the mounting structure so that the article is not supported on the mounting structure by the gravity load portion, such that removal of the weight of the article from the mounting structure unlocks the locking mechanism.

11. The locking mechanism of claim 1, further comprising:
    a position engagement structure configured to apply an additional bias force on the gravity load and locking structure.

12. The locking mechanism of claim 11, wherein the additional bias force acts to move the gravity load portion and the first locking surface toward the unrestrained position and away from the closed position respectively.

13. The locking mechanism of claim 11, wherein the additional bias force acts to move the gravity load portion and the first locking surface away from the unrestrained position and toward the closed position respectively.

14. The locking mechanism of claim 11, wherein the position engagement structure is further configured to disengage the additional bias force once the additional bias force is overcome by a counter-acting force.

15. The locking mechanism of claim 1, further comprising:
    a safety structure that is configured to engage the gravity load and locking structure to inhibit the movement of the gravity load and locking structure.

16. A gravity locking mechanism for removably mounting an article to a mounting structure, comprising:
    a gravity load and locking structure that is movably attached to the article and that is configured to transition between:

an open state, whereat the gravity load and locking structure is unengaged with the mounting structure and the article is unrestrained by the locking mechanism;

a closed state, whereat the gravity load and locking structure is engaged with the mounting structure and the article is unrestrained by the locking mechanism; and a locked state, whereat:
positions of the article, the gravity load and locking structure, and the mounting structure relative to each other in the locked state are identical to positions of the article, the gravity load and locking structure, and the mounting structure relative to each other in the closed state, the mounting structure supports at least a portion of the weight of the article via the gravity load and locking structure, and the article is restrained by the locking mechanism due to the portion of the weight supported on the mounting structure via the gravity load and locking structure.

17. The locking mechanism of claim 16, wherein the gravity load and locking structure is configured to transition between the open state and the closed state based on a position of the article relative to the mounting structure.

18. The locking mechanism of claim 17, wherein the gravity load and locking structure is configured to transition between the closed state and the locked state based on whether the portion of the weight of the article is supported on the mounting structure via the gravity load and locking structure.

19. A locking system, comprising:
a mounting structure that is rigidly supported on a surface, and that defines:
a first alignment surface;
a first locking surface; and
a first load surface; and
an article to be locked on the surface that includes:
an alignment structure fixed to the article, that defines a second alignment surface complementary to the first alignment surface that enables alignment of the article with the mounting structure via engagement with the first alignment surface; and a gravity load and locking structure, including:
a gravity load portion movably attached to the article, wherein:
the gravity load portion is biased by gravity toward an unrestrained position, and
the gravity load portion defines a second load surface configured to bear against the first load surface and cause the gravity load portion to move away from the unrestrained position as the article is moved toward a mounted position relative to the mounting structure; and a second locking surface movably attached to the article, wherein the second locking surface is configured such that:
a movement of the gravity load portion away from and toward the unrestrained position corresponds with a movement of the second locking surface toward and away from a closed position respectively,
the second locking surface is in the closed position when the article is in the mounted position,
the second locking surface engages the first locking surface when the second locking surface is in the closed position, so as to delimit the corresponding movement of the second locking surface and the gravity load portion, and
as at least a portion of a weight of the article is supported on the first load surface via the second load surface, the second locking surface is urged against the first locking surface to hold the mounting structure captive between the second locking surface and the alignment structure and lock the locking mechanism.

20. The locking system of claim 19, wherein the second locking surface is integral with the gravity load portion.

* * * * *